United States Patent
Jiang et al.

(10) Patent No.: US 11,285,613 B2
(45) Date of Patent: Mar. 29, 2022

(54) ROBOT VISION IMAGE FEATURE EXTRACTION METHOD AND APPARATUS AND ROBOT USING THE SAME

(71) Applicant: UBTECH ROBOTICS CORP LTD, Shenzhen (CN)

(72) Inventors: Chenchen Jiang, Shenzhen (CN); Youjun Xiong, Shenzhen (CN); Longbiao Bai, Shenzhen (CN); Simin Zhang, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 243 days.

(21) Appl. No.: 16/699,132

(22) Filed: Nov. 29, 2019

(65) Prior Publication Data

US 2020/0198149 A1    Jun. 25, 2020

(30) Foreign Application Priority Data

Dec. 24, 2018   (CN) .......................... 201811580063.3

(51) Int. Cl.
*G06T 7/73* (2017.01)
*B25J 9/16* (2006.01)
*B25J 13/08* (2006.01)

(52) U.S. Cl.
CPC ........... *B25J 9/1697* (2013.01); *B25J 9/1607* (2013.01); *B25J 13/089* (2013.01)

(58) Field of Classification Search
CPC ...... B25J 9/1697; B25J 9/1607; B25J 13/089; G06T 7/73; G06T 7/80; G05D 1/0274; G05D 1/0246
USPC ......................... 700/259; 382/103, 153, 173
See application file for complete search history.

(56) References Cited

U.S. PATENT DOCUMENTS

| | | | |
|---|---|---|---|
| 2005/0182518 A1* | 8/2005 | Karlsson ............. | G05D 1/0272 700/253 |
| 2005/0234679 A1* | 10/2005 | Karlsson ............. | G05D 1/0248 702/181 |
| 2012/0121161 A1* | 5/2012 | Eade ................... | G05D 1/0253 382/153 |
| 2016/0243704 A1* | 8/2016 | Vakanski .............. | B25J 9/1697 |

* cited by examiner

*Primary Examiner* — Dalena Tran

(57) ABSTRACT

The present disclosure provides a robot visual image feature extraction method as well as an apparatus and a robot using the same. The method includes: collecting image data through visual sensor(s) of the robot, and collecting angular velocity data through inertial sensor(s) of the robot; calculating a relative pose between image frames in the image data based on the angular velocity data; extracting feature points of the first image frame in the image data; calculating a projection position of each feature point of the k-th image frame in the k+1-th image frame based on a relative pose between the k-th image frame and the k+1-th image frame; and searching for each feature point in the projection position in the k+1-th image frame, and performing a synchronous positioning and a mapping based on the searched feature point. In this manner, the feature points of dynamic objects are eliminated.

17 Claims, 4 Drawing Sheets

ROBOT VISION IMAGE FEATURE EXTRACTION METHOD AND APPARATUS AND ROBOT USING THE SAME

CROSS REFERENCE TO RELATED APPLICATIONS

This application claims priority to Chinese Patent Application No. 201811580063.3, filed Dec. 24, 2018, which is hereby incorporated by reference herein as if set forth in its entirety.

BACKGROUND

1. Technical Field

The present disclosure relates to robot technology, and particularly to a robot vision image feature extraction method as well as an apparatus and a robot using the same.

2. Description of Related Art

At present, for the positioning and navigation schemes of a robot, although the laser-based simultaneous localization and mapping (SLAM) technology is more mature, the vision-based SLAM also has certain advantages. These two methods have the trend and potential of mutual integration. Especially for the positioning of three-dimensional scenes, the sensors for the visual SLAM is much cheaper than the laser sensors and can be used in products with severe requirements such as drones because they are lighter in weight. However, the visual SLAM is slightly less robust to dynamic objects. When the proportion of dynamic objects is larger than that of static objects, the positioning information of the visual SLAM will have severe jitters, and the positioning information will be deviated by the dynamic objects, which results in low stability and positioning accuracy.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions in the embodiments of the present disclosure will be clearly and completely described below with reference to the drawings. It should be understood that, the described embodiments are part of the embodiments of the present disclosure, not all of the embodiments. All other embodiments obtained by those skilled in the art based on the embodiments of the present disclosure without creative efforts are within the scope of the present disclosure.

Figure 1:
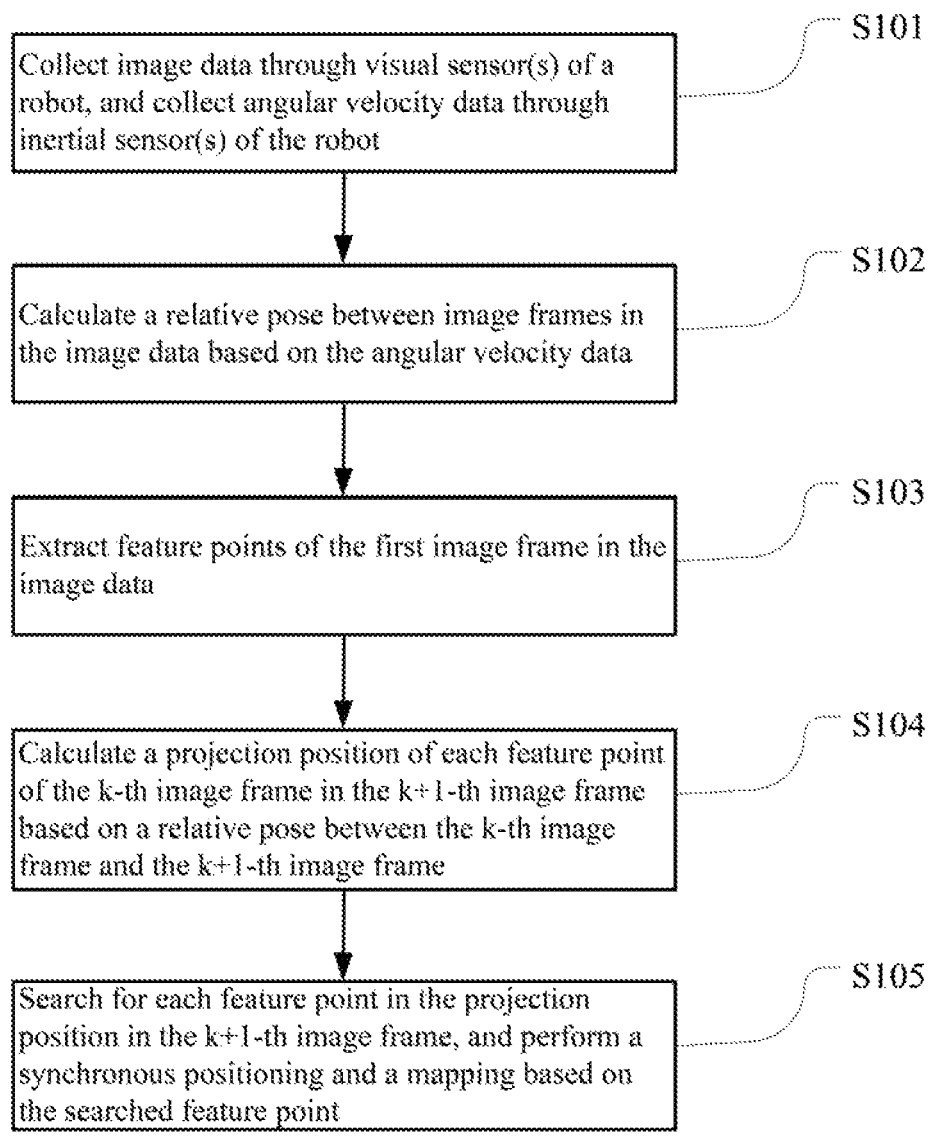
FIG. 1 is a flow chart of an embodiment of a robot visual image feature extraction method according to the present disclosure.
Figure 3:
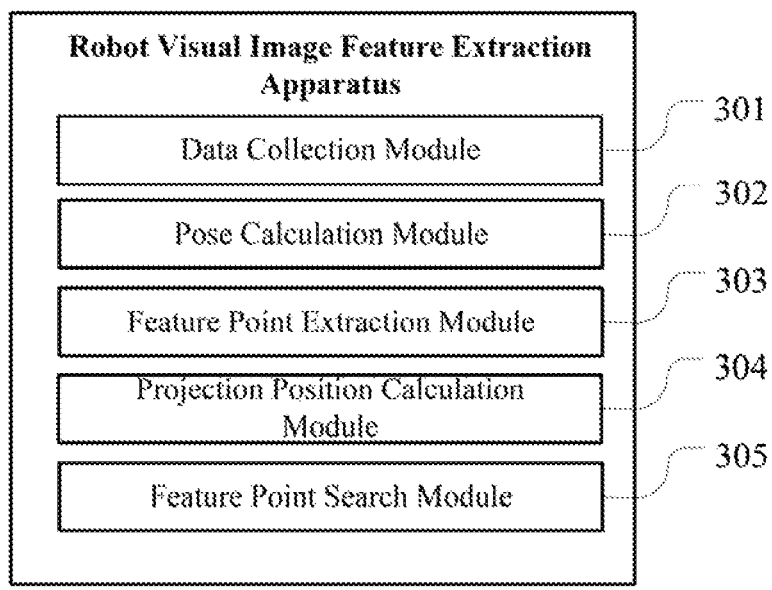
FIG. 3 is a schematic block diagram of an embodiment of a robot visual image feature extraction apparatus according to the present disclosure.
Figure 4:
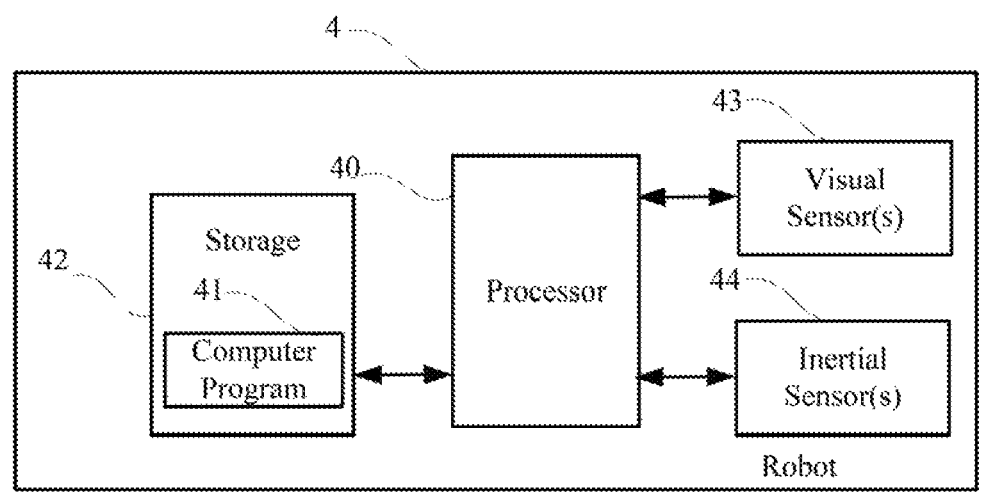
FIG. 4 is a schematic block diagram of an embodiment of a robot according to the present disclosure.

FIG. 1 is a flow chart of an embodiment of a robot visual image feature extraction method according to the present disclosure. In this embodiment, a visual image feature extraction method for a robot is provided. The method is a computer-implemented method executable for a processor, which may be implemented through and applied to a robot visual image feature extraction apparatus as shown in FIG. 3 or a robot as shown in FIG. 4, or implemented through a computer readable storage medium. As shown in FIG. 1, the method includes the following steps.

S101: collecting image data through visual sensor(s) of the robot, and collecting angular velocity data through inertial sensor(s) of the robot.

The visual sensor is a direct source of information of a vision system of the robot, which is mainly composed of one or more cameras including, but not limited to, a monocular camera, a binocular camera, and an RGB-D camera or other kinds of camera. The visual sensor is mainly for obtaining the raw image data to be processed by the vision system of the robot.

The inertial sensor is mainly for detecting and measuring acceleration, tilt, impact, vibration, rotation and multi-degree of freedom motion, and is an important component for realizing navigation, orientation and motion carrier control. In this embodiment, an inertial measurement unit (IMU) is used as the inertial sensor, which is a device for measuring angular velocity and acceleration of a carrier. In general, an IMU includes three single-axis accelerometers and three single-axis gyroscopes. The accelerometer detects an acceleration of a carrier, and the gyroscope detects an angular velocity of the carrier.

S102: calculating a relative pose between image frames in the image data based on the angular velocity data.

First, the image data and the angular velocity data are synchronized because the image data generally has frame rate about 30 frames per second (fps) while the frequency of the IMU is in a range of 200-500 Hz. After synchronization, there will be much angular velocity data between every two frames of images, and the relative pose (a pose includes position and posture) between two frames of images can be calculated by integrating the angular velocity data. Because the frequency of the IMU is very high, it's enough to calculate only the relative rotation matrix while ignoring the pose shift.

In this embodiment, for the k-th image frame (k≥1) and the k+1-th image frame in the image data, the k-th set of the angular velocity data collected between a first moment and a second moment is selected, where the first moment is a moment of collecting the k-th image frame, and the second moment is a moment of collecting the k+1-th image frame. Furthermore, the k-th set of the angular velocity data is integrated to obtain the relative pose between the k-th image frame and the k+1-th image frame.

In which, the k-th set of the angular velocity data is denoted sequentially in the collection order as $\omega_1, \omega_2, \ldots, \omega_i, \ldots,$ and $\omega_N$, where $1 \leq i \leq N$, N is the amount of the collected angular velocity included in the k-th set of the angular velocity data. The process to integrate every two angular velocities is as follows.

The quaternion of the rotation matrix of the angular velocity $\omega_i$ at the i-th moment is expressed as $q_i$, and the measured angular velocity at the i+1-th moment after rotation is $\omega_{i+1}$, and the time interval is $\Delta t$, then the rotation matrix $q_{i+1}$ of the pose can be calculated using the following formulas:

$$K_1 = -\tfrac{1}{2}\omega_i \oplus q_i;$$

$$K_2 = -\tfrac{1}{2}(\omega_i + \tfrac{1}{2}\Delta\omega) \oplus (q_i + \tfrac{1}{2}K_1\Delta t);$$

$$K_3 = -\tfrac{1}{2}(\omega_i + \tfrac{1}{2}\Delta\omega) \oplus (q_i + \tfrac{1}{2}K_2\Delta t);$$

$$K_4 = -\tfrac{1}{2}\omega_{(i+1)} \oplus (q_i + K_3\Delta t); \text{ and}$$

$$Q_{i+1} = q_i + \Delta t/6(K_1 + 2K_2 + 2K_3 + K_4);$$

where, the operator $\omega\oplus$ is expressed as:

$$\begin{bmatrix} 0 & -\omega(2) & \omega(1) & \omega(0) \\ \omega(2) & 0 & -\omega(0) & \omega(1) \\ -\omega(1) & \omega(0) & 0 & \omega(2) \\ -\omega(0) & -\omega(1) & -\omega(2) & 0 \end{bmatrix};$$

where, $\Delta\omega$ is the angular velocity increment between the two angular velocities, and $\omega(0)$, $\omega(1)$ and $\omega(2)$ are the output values of the three gyros, respectively.

The above-mentioned process is iterated from $i=1$ until $i=N-1$, and the rotated quaternion of the k+1-th image frame is calculated as $q_{k+1}$, and the corresponding rotation matrix is $R_{k+1}^k$.

S103: extracting feature points of the first image frame in the image data.

The feature points of an image refer to points in the image that have distinctive characteristics and can effectively reflect the essential features of the image so as to identify target objects in the image.

In this embodiment, the extraction of the feature points in the image can be performed using an algorithm such as features from accelerated segment test (FAST), scale-invariant feature transform (SIFT), and speeded up robust features (SURF), or other similar algorithm.

S104: calculating a projection position of each feature point of the k-th image frame in the k+1-th image frame based on a relative pose between the k-th image frame and the k+1-th image frame.

Figure 2:
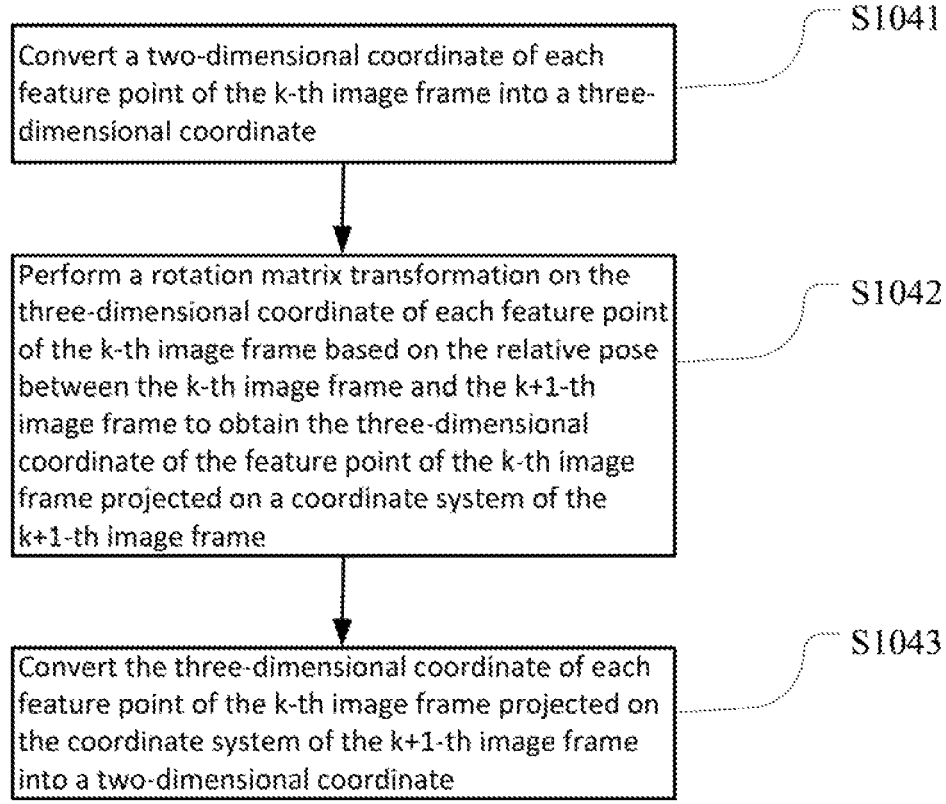
FIG. 2 is a flow chart of an example of calculating a projection position in the method of FIG. 1.

FIG. 2 is a flow chart of an example of calculating a projection position in the method of FIG. 1. As shown in FIG. 2, step S104 that is for calculating the projection position may include the following process:

S1041: converting a two-dimensional coordinate of each feature point of the k-th image frame into a three-dimensional coordinate.

For any one of the feature points $P_k$ of the k-th image frame, assuming that its two-dimensional coordinate in the k-th image frame is $(x, y)$, the normalized three-dimensional coordinate will be $P_{k\text{-}norm} = (x, y, 1)$.

S1042: performing a rotation matrix transformation on the three-dimensional coordinate of each feature point of the k-th image frame based on the relative pose between the k-th image frame and the k+1-th image frame to obtain the three-dimensional coordinate of the feature point of the k-th image frame projected on a coordinate system of the k+1-th image frame.

In this embodiment, the three-dimensional coordinate $P'_{k+1}$ of any one of the feature points of the k-th image frame that is projected in the coordinate system of the k+1-th image frame can be calculated using the following formula:

$$P_{k+1}' = R_{k+1}^{kT} * P_{k\text{-}norm};$$

where, T is a matrix transpose symbol.

Furthermore, the three-dimensional coordinate of each feature point of the k-th image frame that is projected on the coordinate system of the k+1-th image frame can be normalized based on the following formula to obtain the normalized three-dimensional coordinate:

$$P_{k+1\text{-}norm} = (p_{k+1}'(0)/p_{k+1}'(2), p_{k+1}'(1)/p_{k+1}'(2), 1);$$

where, $P_{k+1\text{-}norm}$ is the normalized three-dimensional coordinate, and $P_{k+1}'(0)$, $P_{k+1}'(1)$ and $P_{k+1}'(2)$ are the components of $P_{k+1}'$ in the directions of the three coordinate axes, respectively.

In addition, the normalized three-dimensional coordinate is adjusted based on an internal parameter matrix of the visual sensor to obtain the adjusted three-dimensional coordinate.

The internal parameter matrix of the visual sensor is denoted as K:

$$K = \begin{bmatrix} f_x & 0 & c_x \\ 0 & f_y & c_y \\ 0 & 0 & 1 \end{bmatrix};$$

where, $f_x$ and $f_y$ are focal lengths of cameras, $c_x$ and $c_y$ are the coordinates of a principal point of the camera. The internal parameters of each camera are fixed values which can be obtained by calibrating the camera.

The adjusted three-dimensional coordinates can be calculated based on the following formula:

$$P_{k+1} = K * P_{k+1\text{-}norm}.$$

S1043: converting the three-dimensional coordinate of each feature point of the k-th image frame projected on the coordinate system of the k+1-th image frame into a two-dimensional coordinate.

That is, the converted two-dimensional coordinate is composed using the components in directions of the first two coordinate axes of the adjusted three-dimensional coordinate, where the two-dimensional coordinate is the projection position of the feature point of the k-th image frame on the k+1-th image frame.

S105: searching for each feature point in the projection position in the k+1-th image frame, and performing a synchronous positioning and a mapping based on the searched feature point.

Considering the error of the inertial sensor itself and the error caused in the process of integral calculation, the calculated projection position of each feature point in the k+1-th image frame may have some deviation. Therefore, when searching feature points, an optical flow algorithm can be used to accurately search for the possible feature points within a certain range of each feature point according to the initial position of the feature point in the current frame. Since the scope of the search will not be too large, the required calculation amount is also small. In which, the premise for using the optical flow algorithm include: first, constant brightness, that is, the brightness of a same point does not change with time, which is the assumption of the basic optical flow algorithm that is for obtaining the basic equation of the optical flow algorithm; second, small motion, that is, the position will not change sharply with time, so that the partial derivative of the gray scale with respect to the position can be obtained, which is also an indispensable assumption for the optical flow algorithm; third, consistent space, that is, the adjacent points in a scene will also be the adjacent points after projecting onto the image, and the adjacent points have the same velocity, which is a unique assumption of the Lucas-Kanade optical flow algorithm. Because the optical flow algorithm has only one basic equation constraint, that is, there are two unknown variables for the velocities in the x and y directions. It is assumed that similar motions are performed in the neighborhood of the feature point, and n equations can be simulated to obtain the velocities in the x and y directions (n is the total amount of points in the neighborhood of the feature point, which includes the feature point). Multiple equations are used to calculate the two unknown variables, which are linear equations and can use the least squares method to obtain the final result. In which, the minimum sum of the squared errors is used as an optimization goal.

Since the feature points of a dynamic object will have large positional deviation between the actual position of the current frame and the positional deviation after the projection, the optical flow algorithm cannot find the matching feature points near the projection point, which indirectly removes the feature points of the dynamic object. It should be noted that, since only some feature points will be tracked at a time, the amount of the feature points will gradually decrease. In order to ensure that the visual SLAM has a certain amount of feature points, it needs to be supplement the feature points after using the optical flow tracking.

In this embodiment, it counts an amount of first feature points, where the first feature points are the feature points searched in the projection position in the k+1-th image frame; calculates a difference between a preset threshold and the amount of the first feature points, if the amount of the first feature points is less than the preset threshold; and extract L second feature points from the k+1-th image frame, where L is the difference between the preset threshold and the amount of the first feature points, and the second feature points are the feature points in the k+1-th image frame different from the first feature points. These newly extracted second feature points are supplemented to the original feature points, and a stable amount of feature points can be continuously generated by repeating the above-mentioned steps. In this manner, it ensures that there will have a sufficient amount of feature points for the visual SLAM.

In summary, in this embodiment, it collects image data through the visual sensor(s) of the robot, and collects angular velocity data through the inertial sensor(s) of the robot; calculates a relative pose between image frames in the image data based on the angular velocity data; and then extracts feature points of the first image frame in the image data. It calculates the projection position of each feature point of the current image frame in the next image frame according to the relative pose between the current image frame and the next image frame, and searches for each feature point in the projection position in the next image frame. Since the positions of the feature points of the dynamic object will have large deviation between the two frames, for the dynamic object, its feature points cannot be searched out in the projection position in the next image frame, and only the feature points of static objects can be searched out, thereby eliminating the feature points of the dynamic object, which greatly improves the stability and positioning accuracy of the visual SLAM.

FIG. 3 is a schematic block diagram of an embodiment of a robot visual image feature extraction apparatus according to the present disclosure. In this embodiment, a visual image feature extraction apparatus for a robot (e.g., a humanoid robot) is provided. The visual image feature extraction apparatus, which may be a standalone device, or be applied to a robot shown in FIG. 4. The visual image feature extraction apparatus corresponds to the above-mentioned robot visual image feature extraction method of FIG. 1. As shown in FIG. 3, the apparatus may include:

a data collection module 301 configured to collect image data through visual sensor(s) of the robot, and collect angular velocity data through inertial sensor(s) of the robot;

a pose calculation module 302 configured to calculate a relative pose between image frames in the image data based on the angular velocity data;

a feature point extraction module 303 configured to extract feature points of the first image frame in the image data;

a projection position calculation module 304 configured to calculate a projection position of each feature point of the k-th image frame in the k+1-th image frame based on a relative pose between the k-th image frame and the k+1-th image frame, where k≥1; and a feature point search module 305 configured to search for each feature point in the projection position in the k+1-th image frame, and perform a synchronous positioning and a mapping based on the searched feature point.

Furthermore, the pose calculation module 302 may include:

an angular velocity data selection unit configured to select the k-th set of the angular velocity data collected between a first moment and a second moment, wherein the first moment is a moment of collecting the k-th image frame, and the second moment is a moment of collecting the k+1-th image frame; and an integral calculation unit configured to integrate the k-th set of the angular velocity data to obtain the relative pose between the k-th image frame and the k+1-th image frame.

Furthermore, the projection position calculation module 304 may include:

a first coordinate conversion unit configured to convert a two-dimensional coordinate of each feature point of the k-th image frame into a three-dimensional coordinate;

a rotation matrix transformation unit configured to perform a rotation matrix transformation on the three-dimensional coordinate of each feature point of the k-th image frame based on the relative pose between the k-th image frame and the k+1-th image frame to obtain the three-dimensional coordinate of the feature point of the k-th image frame projected on a coordinate system of the k+1-th image frame; and a second coordinate conversion unit configured to convert the three-dimensional coordinate of each feature point of the k-th image frame projected on the coordinate system of the k+1-th image frame into a two-dimensional coordinate.

Furthermore, the projection position calculation module 304 may include:

a normalization processing unit configured to normalize the three-dimensional coordinate of each feature point of the k-th image frame projected on the coordinate system of the k+1-th image frame to obtain the normalized three-dimensional coordinate; and a coordinate adjustment unit configured to adjust the normalized three-dimensional coordinate based on an internal parameter matrix of the visual sensor to obtain the adjusted three-dimensional coordinate.

Furthermore, the feature extraction apparatus may further include:

a feature point counting module configured to count an amount of first feature points, where the first feature points are the feature points searched in the projection position in the k+1-th image frame;

a difference calculation module configured to calculate a difference between a preset threshold and the amount of the first feature points in response to the amount of the first feature points being less than the preset threshold; and a second feature point extraction module configured to extract L second feature points from the k+1-th image frame, wherein L is the difference between the preset threshold and the amount of the first feature points, and the second feature points are the feature points in the k+1-th image frame different from the first feature points.

A person skilled in the art can clearly understand that, for the convenience and brevity of the description, the specific working process of the above-mentioned device, module and unit can refer to the corresponding process in the foregoing method embodiment, and details are not described herein again.

In this embodiment, each of the above-mentioned modules/units is implemented in the form of software, which can be computer program(s) stored in a memory of the visual image feature extraction apparatus and executable on a processor of the visual image feature extraction apparatus. In other embodiments, each of the above-mentioned modules/units may be implemented in the form of hardware (e.g., a circuit of the visual image feature extraction apparatus which is coupled to the processor of the visual image feature extraction apparatus) or a combination of hardware and software (e.g., a circuit with a single chip microcomputer).

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic block diagram of an embodiment of a robot according to the present disclosure. As shown in FIG. 4, in this embodiment, the robot 4 includes a processor 40, a storage 41, a computer program 42 stored in the storage 41 and executable on the processor 40, visual sensor(s) 43, and inertial sensor(s) 44. When executing (instructions in) the computer program 42, the processor 40 implements the steps in the above-mentioned embodiments of the robot visual image feature extraction method, for example, steps S101-S105 shown in FIG. 2. Alternatively, when the processor 40 executes the (instructions in) computer program 42, the functions of each module/unit in the above-mentioned device embodiments, for example, the functions of the modules 301-305 shown in FIG. 3 are implemented.

Exemplarily, the computer program 42 may be divided into one or more modules/units, and the one or more modules/units are stored in the storage 41 and executed by the processor 40 to realize the present disclosure. The one or more modules/units may be a series of computer program instruction sections capable of performing a specific function, and the instruction sections are for describing the execution process of the computer program 42 in the robot 4.

The robot 4 may be a computing device such as a desktop computer, a notebook computer, a tablet computer, and a cloud server. The robot 4 may include, but is not limited to, the processor 40 and the storage 41. It can be understood by those skilled in the art that FIG. 4 is merely an example of the robot 4 and does not constitute a limitation on the robot 4, and may include more or fewer components than those shown in the figure, or a combination of some components or different components. For example, the robot 4 may further include an input/output device, a network access device, a bus, and the like.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the robot 4, for example, a hard disk or a memory of the robot 4. The storage 41 may also be an external storage device of the robot 4, for example, a plug-in hard disk, a smart media card (SMC), a secure digital (SD) card, flash card, and the like, which is equipped on the robot 4. Furthermore, the storage 41 may further include both an internal storage unit and an external storage device, of the robot 4. The storage 41 is configured to store the computer program 42 and other programs and data required by the robot 4. The storage 41 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented visual image feature extraction method for a robot, comprising executing on a processor steps of:

collecting image data through one or more visual sensors of the robot, and collecting angular velocity data through one or more inertial sensors of the robot;

calculating a relative pose between image frames in the image data based on the angular velocity data;

extracting feature points of the first image frame in the image data;

calculating a projection position of each feature point of the k-th image frame in the k+1-th image frame based on a relative pose between the k-th image frame and the k+1-th image frame, wherein k≥1; and searching for each feature point in the projection position in the k+1-th image frame, and performing a synchronous positioning and a mapping based on the searched feature point.

2. The method of claim 1, wherein the step of calculating the relative pose between the image frames in the image data based on the angular velocity data comprises:

selecting the k-th set of the angular velocity data collected between a first moment and a second moment, wherein the first moment is a moment of collecting the k-th image frame, and the second moment is a moment of collecting the k+1-th image frame; and integrating the k-th set of the angular velocity data to obtain the relative pose between the k-th image frame and the k+1-th image frame.

3. The method of claim 1, wherein the step of calculating the projection position of each feature point of the k-th image frame in the k+1-th image frame based on the relative pose between the k-th image frame and the k+1-th image frame comprises:

converting a two-dimensional coordinate of each feature point of the k-th image frame into a three-dimensional coordinate;

performing a rotation matrix transformation on the three-dimensional coordinate of each feature point of the k-th image frame based on the relative pose between the k-th image frame and the k+1-th image frame to obtain the three-dimensional coordinate of the feature point of the k-th image frame projected on a coordinate system of the k+1-th image frame; and converting the three-dimensional coordinate of each feature point of the k-th image frame projected on the coordinate system of the k+1-th image frame into a two-dimensional coordinate.

4. The method of claim 3, wherein before the step of converting the three-dimensional coordinate of each feature point of the k-th image frame projected on the coordinate system of the k+1-th image frame into the two-dimensional coordinate further comprises:

normalizing the three-dimensional coordinate of each feature point of the k-th image frame projected on the coordinate system of the k+1-th image frame to obtain the normalized three-dimensional coordinate; and adjusting the normalized three-dimensional coordinate based on an internal parameter matrix of the visual sensor to obtain the adjusted three-dimensional coordinate.

5. The method of claim 3, wherein the step of converting the three-dimensional coordinate of each feature point of the k-th image frame projected on the coordinate system of the k+1-th image frame into the two-dimensional coordinate comprises:

composing the converted two-dimensional coordinate using the components in directions of the first two coordinate axes of the adjusted three-dimensional coordinate.

6. The method of claim 1, wherein the step of searching for each feature point in the projection position in the k+1-th image frame comprises:

counting an amount of first feature points, wherein the first feature points are the feature points searched in the projection position in the k+1-th image frame;

calculating a difference between a preset threshold and the amount of the first feature points in response to the amount of the first feature points being less than the preset threshold; and extracting L second feature points from the k+1-th image frame, wherein L is the difference between the preset threshold and the amount of the first feature points, and the second feature points are the feature points in the k+1-th image frame different from the first feature points.

7. A visual image feature extraction apparatus for a robot, comprising:

a data collection module configured to collect image data through one or more visual sensors of the robot, and collect angular velocity data through one or more inertial sensors of the robot;

a pose calculation module configured to calculate a relative pose between image frames in the image data based on the angular velocity data;

a feature point extraction module configured to extract feature points of the first image frame in the image data;

a projection position calculation module configured to calculate a projection position of each feature point of the k-th image frame in the k+1-th image frame based on a relative pose between the k-th image frame and the k+1-th image frame, wherein k≥1; and a feature point search module configured to search for each feature point in the projection position in the k+1-th image frame, and perform a synchronous positioning and a mapping based on the searched feature point.

8. The apparatus of claim 7, where the projection position calculation module comprises:

a first coordinate conversion unit configured to convert a two-dimensional coordinate of each feature point of the k-th image frame into a three-dimensional coordinate;

a rotation matrix transformation unit configured to perform a rotation matrix transformation on the three-dimensional coordinate of each feature point of the k-th image frame based on the relative pose between the k-th image frame and the k+1-th image frame to obtain the three-dimensional coordinate of the feature point of the k-th image frame projected on a coordinate system of the k+1-th image frame; and a second coordinate conversion unit configured to convert the three-dimensional coordinate of each feature point of the k-th image frame projected on the coordinate system of the k+1-th image frame into a two-dimensional coordinate.

9. The apparatus of claim 8, wherein the projection position calculation module comprises:

a normalization processing unit configured to normalize the three-dimensional coordinate of each feature point of the k-th image frame projected on the coordinate system of the k+1-th image frame to obtain the normalized three-dimensional coordinate; and a coordinate adjustment unit configured to adjust the normalized three-dimensional coordinate based on an internal parameter matrix of the visual sensor to obtain the adjusted three-dimensional coordinate.

10. The apparatus of claim 7, wherein the pose calculation module comprises:

an angular velocity data selection unit configured to select the k-th set of the angular velocity data collected between a first moment and a second moment, wherein the first moment is a moment of collecting the k-th image frame, and the second moment is a moment of collecting the k+1-th image frame; and an integral calculation unit configured to integrate the k-th set of the angular velocity data to obtain the relative pose between the k-th image frame and the k+1-th image frame.

11. The apparatus of claim 7, further comprising:

a feature point counting module configured to count an amount of first feature points, where the first feature points are the feature points searched in the projection position in the k+1-th image frame;

a difference calculation module configured to calculate a difference between a preset threshold and the amount of the first feature points in response to the amount of the first feature points being less than the preset threshold; and a second feature point extraction module configured to extract L second feature points from the k+1-th image frame, wherein L is the difference between the preset threshold and the amount of the first feature points, and the second feature points are the feature points in the k+1-th image frame different from the first feature points.

12. A robot, comprising:

one or more visual sensors;

one or more inertial sensors;

a memory, a processor; and one or more computer programs stored in the memory and executable on the processor, wherein the one or more computer programs comprise:

instructions for collecting image data through one or more visual sensors of the robot, and collecting angular velocity data through one or more inertial sensors of the robot;

instructions for calculating a relative pose between image frames in the image data based on the angular velocity data;

instructions for extracting feature points of the first image frame in the image data;

instructions for calculating a projection position of each feature point of the k-th image frame in the k+1-th image frame based on a relative pose between the k-th image frame and the k+1-th image frame, wherein k≥1; and instructions for searching for each feature point in the projection position in the k+1-th image frame, and performing a synchronous positioning and a mapping based on the searched feature point.

13. The robot of claim 12, wherein the instructions for calculating the relative pose between the image frames in the image data based on the angular velocity dab comprise:

instructions for selecting the k-th set of the angular velocity data collected between a first moment and a second moment, wherein the first moment is a moment of collecting the k-th image frame, and the second moment is a moment of collecting the k+1-th image frame; and instructions for integrating the k-th set of the angular velocity data to obtain the relative pose between the k-th image frame and the k+1-th image frame.

14. The robot of claim 12, wherein the instructions for calculating the projection position of each feature point of the k-th image frame in the k+1-th image frame based on the relative pose between the k-th image frame and the k+1-th image frame comprise:
   instructions for converting a two-dimensional coordinate of each feature point of the k-th image frame into a three-dimensional coordinate;
   instructions for performing a rotation matrix transformation on the three-dimensional coordinate of each feature point of the k-th image frame based on the relative pose between the k-th image frame and the k+1-th image frame to obtain the three-dimensional coordinate of the feature point of the k-th image frame projected on a coordinate system of the k+1-th image frame; and
   instructions for converting the three-dimensional coordinate of each feature point of the k-th image frame projected on the coordinate system of the k+1-th image frame into a two-dimensional coordinate.

15. The robot of claim 14, wherein the one or more computer programs further comprise:
   instructions for normalizing the three-dimensional coordinate of each feature point of the k-th image frame projected on the coordinate system of the k+1-th image frame to obtain the normalized three-dimensional coordinate; and
   instructions for adjusting the normalized three-dimensional coordinate based on an internal parameter matrix of the visual sensor to obtain the adjusted three-dimensional coordinate.

16. The robot of claim 14, wherein the instructions for converting the three-dimensional coordinate of each feature point of the k-th image frame projected on the coordinate system of the k+1-th image frame into the two-dimensional coordinate comprise:
   instructions for composing the converted two-dimensional coordinate using the components in directions of the first two coordinate axes of the adjusted three-dimensional coordinate.

17. The robot of claim 12, wherein the instructions for searching for each feature point in the projection position in the k+1-th image frame comprise:
   instructions for counting an amount of first feature points, wherein the first feature points are the feature points searched in the projection position in the k+1-th image frame;
   instructions for calculating a difference between a preset threshold and the amount of the first feature points in response to the amount of the first feature points being less than the preset threshold; and
   instructions for extracting L second feature points from the k+1-th image frame, wherein L is the difference between the preset threshold and the amount of the first feature points, and the second feature points are the feature points in the k+1-th image frame different from the first feature points.

* * * * *